United States Patent [19]

Sannomiya et al.

[11] Patent Number: 4,938,526

[45] Date of Patent: Jul. 3, 1990

[54] WIPER MOUNTING STRUCTURE

[75] Inventors: Masayoshi Sannomiya, Hiroshima; Reiji Kikuchi, Higashihiroshima; Junji Kubogami, Hiroshima, all of Japan

[73] Assignee: Mazda Motor Corporation, Hiroshima, Japan

[21] Appl. No.: 128,650

[22] Filed: Dec. 3, 1987

[30] Foreign Application Priority Data

Dec. 4, 1986 [JP] Japan ................................. 61-289528
Jan. 20, 1987 [JP] Japan ................................. 62-11084

[51] Int. Cl.[5] ...................... B62D 25/08; B62D 25/14; B60S 1/18
[52] U.S. Cl. .................................. 296/192; 15/250.16; 15/250.27; 15/250.34
[58] Field of Search ............................. 296/192, 194; 15/250.16, 250.17, 250.27, 250.34

[56] References Cited

U.S. PATENT DOCUMENTS

| | | | |
|---|---|---|---|
| 2,760,221 | 8/1956 | Hitzelberger | 15/250.27 X |
| 2,779,199 | 1/1957 | Lincoln et al. | 15/250.17 X |
| 2,970,335 | 2/1961 | Webb | 15/250.17 X |
| 3,025,552 | 3/1962 | Contant | 15/250.16 |
| 3,261,215 | 7/1966 | Simpson | 15/250.27 X |
| 3,694,846 | 10/1972 | Parker | 15/250.16 |
| 3,788,681 | 1/1974 | Barenyi et al. | 15/250.16 X |
| 4,718,713 | 1/1988 | Sakamoto et al. | 296/192 |
| 4,780,926 | 11/1988 | Kondo et al. | 296/24.1 X |
| 4,791,698 | 12/1988 | Murata | 15/250.13 |

FOREIGN PATENT DOCUMENTS

| | | | |
|---|---|---|---|
| 1430791 | 12/1968 | Fed. Rep. of Germany | . |
| 2529949 | 8/1976 | Fed. Rep. of Germany | . |
| 2712361 | 9/1978 | Fed. Rep. of Germany | 15/250.34 |
| 2161668 | 7/1973 | France | . |
| 14296 | 4/1984 | Japan | . |

Primary Examiner—Dennis H. Pedder
Attorney, Agent, or Firm—Fleit, Jacobson, Cohn, Price, Holman & Stern

[57] ABSTRACT

A wiper mounting structure for a vehicle having a dash lower panel separating a cabin from an engine compartment, a dash upper panel connected to the upper portion of the dash lower panel and a cowl panel connected with the dash upper panel and supporting the lower end of a front window glass at one end thereof, the other end of the cowl panel being disposed in the vicinity of the rear end of a bonnet, the wiper mounting structure including a wiper secured to the cowl panel and a wiper driving device secured to the dash lower panel, the wiper and the wiper driving device being connected by a link member, and being capable of reducing the air resistance of the vehicle and resulting in a vehicle having good appearance.

10 Claims, 10 Drawing Sheets

WIPER MOUNTING STRUCTURE

BACKGROUND OF THE INVENTION

The present invention relates to a wiper mounting structure for vehicles, and more particularly to such a structure capable of reducing the air resistance of a vehicle and obtaining a vehicle having good appearance.

DESCRIPTION OF PRIOR ART

In a wiper apparatus for vehicles, a wiper is generally driven by directly driving a link mechanism connected to the wiper by a wiper motor or driving the link mechanism through a gear train by the wiper motor. In the case where the link mechanism is directly driven by the wiper motor, the wiper motor is arranged so that the shaft thereof is disposed substantially horizontally and in the case where the link mechanism is driven through the gear train by the wiper motor, the gear train is arranged so that the shaft of the gear adjacent to the wiper motor is disposed substantially horizontally.

For example, Japanese Patent Publication No. 59(1984)-14296 discloses a wiper apparatus in which a cowl box is formed by a front panel having a concave portion extending laterally, a duct panel and a front bulkhead and in which a wiper link mechanism is disposed between a cowl panel and the concave portion of the front panel and in which a wiper motor is secured to the front surface of the duct panel so that the shaft thereof extends slightly downwardly. In this prior art apparatus, there are further provided an operation lever swingably fixed to the motor shaft, a lever swingably secured to a wiper shaft on which a wiper arm is swingably mounted and a link connected to a pin provided at the end of the operation lever and a pin provided at the end of the lever, and when the operation lever is swung by the wiper motor about the motor shaft, the link is reciprocated so that a wiper arm is swung about the wiper shaft.

However, this prior art cannot meet recent requirements for reduced vehicle body air resistance and improved vehicle appearance as obtained by lowering the levels of the cowl panel and the bonnet (hood) More specifically, in the prior art apparatus, since a wiper driving device including the wiper motor is disposed so that the shaft of the wiper motor extends slightly downwardly and the wiper motor is arranged between the front panel and the front bulkhead forming the bottom portion of the cowl box on the front side of the front panel, it is necessary to make the distance between the front panel and the front bulkhead larger than the outer diameter of the wiper motor, whereby the size of the cowl box cannot be prevented from becoming large. As a result, since the levels of the front panel, the cowl panel and a bonnet have to be higher, the air resistance inevitably increases and it is very difficult to obtain a vehicle having good appearance by lowering the levels of the cowl panel, the bonnet and the like.

SUMMARY OF THE INVENTION

It is therefore the object of the invention to provide a wiper mounting structure capable of lowering the levels of the cowl panel and the bonnet, reducing the air resistance of the vehicle and obtaining a vehicle having good appearance with a simple structure.

According to the present invention, the above and other objects can be accomplished by a wiper mounting structure for a vehicle having dash lower panel means separating the cabin from the engine compartment, dash upper panel means connected to the upper portion of the dash lower panel means and cowl panel means connected with the dash upper panel means and supporting the lower end of a front window glass at one end thereof, the other end of the cowl panel means being disposed in the vicinity of the rear end of bonnet means, said wiper mounting structure comprising wiper means secured to said cowl panel means and wiper driving means secured to said dash lower panel means, said wiper means and said wiper driving means being connected by link means.

The above and other objects and features of the present invention will be apparent from the following description made with reference to the accompanying drawings.

DESCRIPTION OF THE PREFERRED EMBODIMENTS

Figure 1:
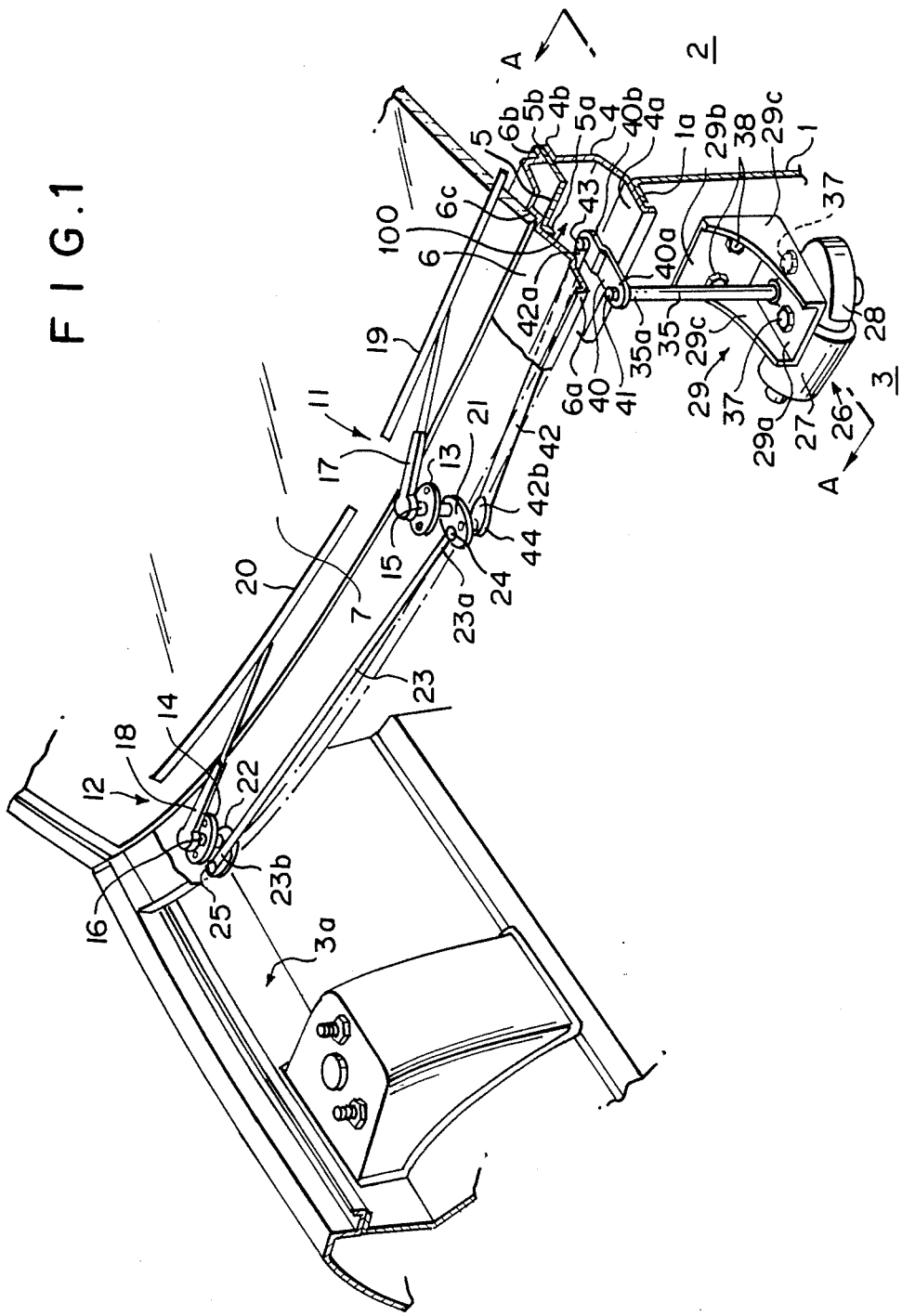
FIG. 1 is a schematic drawing showing a perspective view of a wiper mounting structure which is an embodiment of the present invention.
Figure 2:
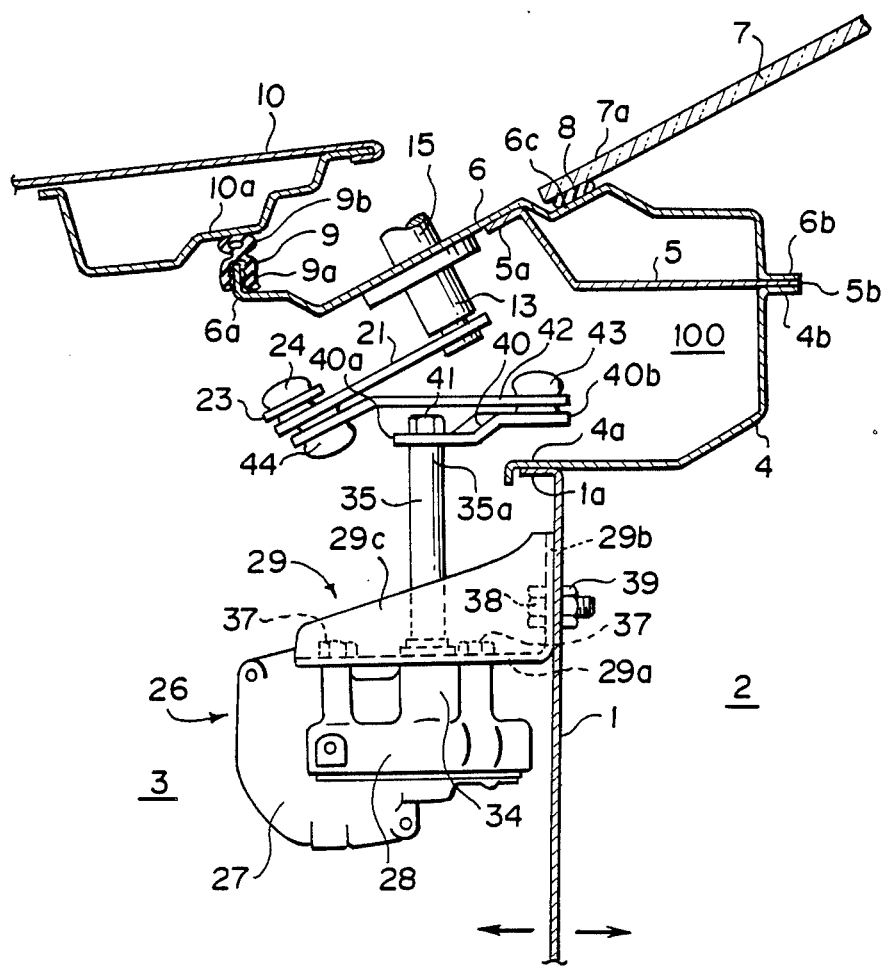
FIG. 2 is a schematic drawing showing a cross-sectional view taken on line A—A of FIG. 1.

Referring to FIGS. 1 and 2, there is provided a dash lower panel 1 separating a cabin 2 of a vehicle body from an engine compartment 3 thereof and the upper end 1a of the dash lower panel 1 is connected with the front end 4a of a dash upper panel 4. The rear end 4b of the dash upper panel 4 is connected with both the rear end 5b of a reinforcing plate 5 and the rear end 6b of a cowl panel 6 extending laterally and the front end 5a of the reinforcing plate 5 is connected with the inner surface of the cowl panel 6. The dash lower panel 1, the dash upper panel 4, the reinforcing plate 5 and the cowl panel 6 are respectively connected to the side walls 3a of the engine compartment 3 at the side ends thereof, and a channel-like cowl box 100 is formed by the dash upper panel 4, the reinforcing plate 5 and the cowl panel 6 so as to be disposed at the upper end 1a of the dash lower panel 1 and extend laterally with respect to the vehicle body and be connected to the side walls 3a of the engine compartment 3 at the side ends thereof. The cowl panel 6 is formed with a convex portion 6c to support the lower end 7a of a front window glass (windshield) 7 through a supporting member 8 and the front end 6a of the cowl panel 6 is engaged with the fixed portion 9a of a sealing member 9, the sealing portion 9b of which is contacted with the lower portion 10a of the rear end of a bonnet (hood) 10.

Wipers 11 and 12 are secured to the cowl panel 6. More specifically, mounting members 13 and 14 are secured to the cowl panel 6 for pivotally mounting wiper shafts 15 and 16 to one ends of which wiper arms 17 and 18 are respectively secured and wiper blades 19 and 20 are secured to the ends of the respective wiper arms 17 and 18. Levers 21 and 22 are fixed to the other ends of the respective wiper shafts 15 and 16 and the levers 21 and 22 are connected by a link 23 so that one end 23a of the link 23 is pivotally mounted on a pin member 24 provided for the lever 21 and that the other end 23b of the link 23 is pivotally mounted on a pin member 25 provided for the lever 22.

A wiper driving device 26 comprising a wiper motor 27 and a gear case 28 secured to the surface of the dash lower panel 1 on the side of the engine room 3 and the gear case 28 is fixed to the dash lower panel 1 by a bracket 29.

Figure 3:
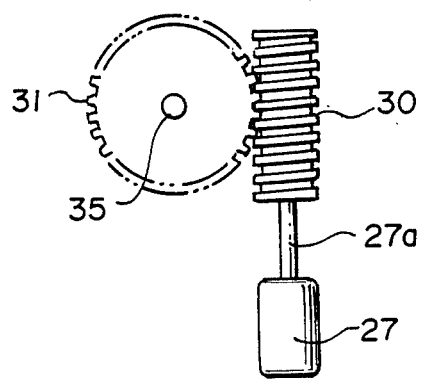
FIG. 3 is a schematic drawing showing a plan view of the structure of a wiper driving device used in the wiper mounting structure shown in FIGS. 1 and 2.

As shown in FIG. 3, the output shaft 27a of the wiper motor 27 extends in the lateral direction of the vehicle body parallel to the dash lower panel 1 and a worm gearing 30 is secured to the end portion of the output shaft 27a. There is further provided a gear 31 engaged with the worm gear 30.

Figure 4:
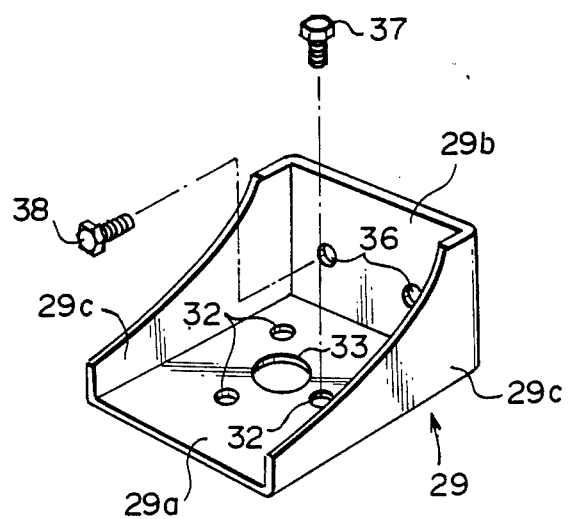
FIG. 4 is a schematic drawing showing a perspective view of a bracket used in the wiper mounting structure shown in FIGS. 1 and 2.

As shown in FIG. 4, the bracket 29 comprises a bottom portion 29a for securing the gear case, a rear wall portion 29b extending upwardly for being secured to the dash lower panel 1 and side wall portions 29c extending upwardly for reinforcing the bracket 29. The bottom portion 29a is formed with small holes 32 with which the gear case 28 is engaged by bolts and a large hole 33 which receives a base portion 34 for supporting a rotatable shaft 35 which is the shaft of the gear 31. The rear wall portion 29b is formed with holes 36 the positions of which correspond to those of holes (not shown) formed in the dash lower panel 1. The wiper driving device 26 is secured to the lower surface of the bracket 29 by inserting the base portion 34 of the gear case 28 into the large hole 33 of the bottom portion of the bracket 29 and screwing bolts 37 inserted into the small holes 32 and holes (not shown) of the upper surface of the gear case 28. Further, the bracket 29 is secured to the dash lower panel 1 by inserting bolts 38 into the holes 36 of the rear wall portion 29b and the holes formed in the dash lower panel 1 and engaging them with nuts 39. Thus, the wiper driving device 26 is secured to the dash lower panel 1 through the bracket 29.

One end 40a of an operation lever 40 is secured to the upper end 35a of the rotatable shaft 35 by a bolt 41 and the other end 40b of the operation lever 40 is connected with the lever 21 of the wiper shaft 15 by an operation link 42 so that one end 42a of the operation link 42 is engaged with a pin 43 formed at the end 40b of the operation lever 40 and that the other end 42b of the operation link 42 is engaged with a pin 44 formed on the opposite surface of the lever 21 to that on which the pin 24 is formed.

The above described wiper mounting structure operates as follows.

When the wiper motor 27 is driven, the rotatable shaft 35 is rotated and the operation lever 40 fixed at the upper end 35a of the rotatable shaft 35 is swung about the rotatable shaft 35 so that the operation link 42 is reciprocated and that the lever 21 of the wiper shaft 15 is swung about the wiper shaft 15 engaged with the mounting member 13 fixed to the cowl panel 6. Further, the movement of the lever 21 is transmitted to the lever 22 of the wiper shaft 16 by the link 23 and the lever 22 is also swung about the wiper shaft 16 engaged with the mounting member 14 fixed to the cowl panel 6. As a result, since the wiper shafts 15 and 16 are rotated in accordance with the swinging of the levers 21 and 22, the respective wiper arms 17 and 18 are swung about the wiper shafts 15 and 16, and the two wiper blades 19 and 20 synchronously sweep the surface of the front window glass 7.

According to the above described embodiment, since the wiper driving device 26 is secured to the dash lower panel 1 so that it is positioned lower than the upper end 1a of the dash lower panel 1, it is possible to remarkably lower the levels of the cowl panel 6 and the bonnet 10 as compared with the prior art apparatus in which the wiper driving device is secured to the front surface of the cowl panel. Further, since the output shaft 27a of the wiper motor 27 is arranged in the lateral direction of the vehicle body parallel to the dash lower panel 1, it is possible to employ the worm gearing for transmitting the rotation of the output shaft 27a of the wiper motor 27, whereby the gear mechanism can be made compact.

Figure 5:
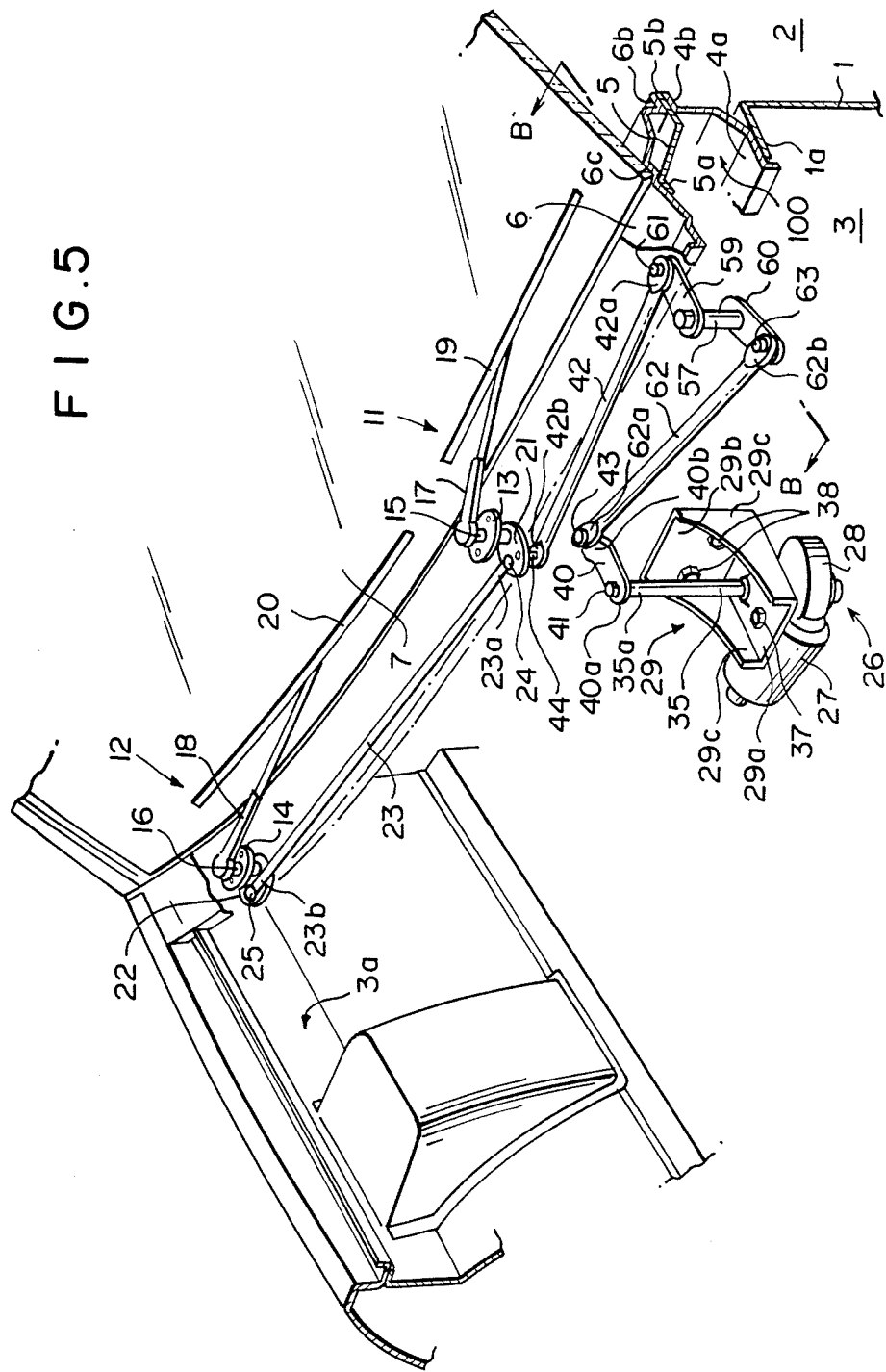
FIG. 5 is a schematic drawing showing a perspective view of a wiper mounting structure which is another embodiment of the present invention.
Figure 6:
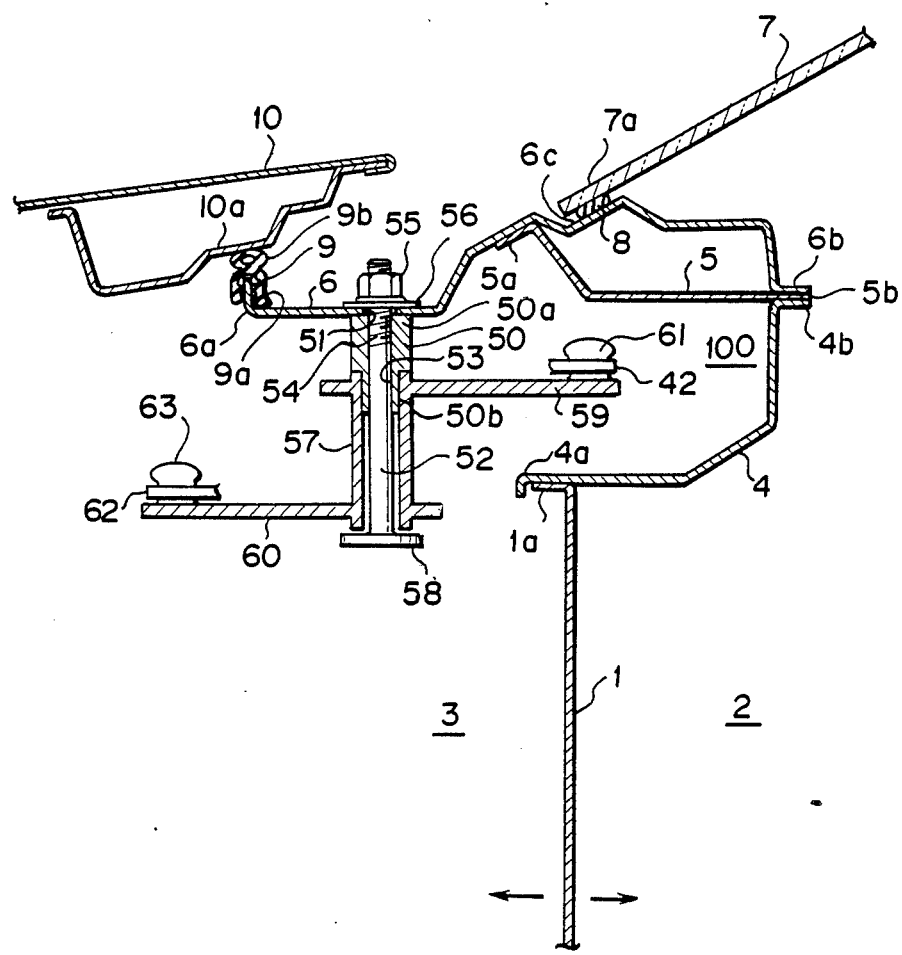
FIG. 6 is a schematic drawing showing a cross-sectional view taken on line B—B of FIG. 5.

FIGS. 5 and 6 show a wiper mounting structure which is another embodiment of the present invention. In FIGS. 5 and 6, corresponding parts are designated by the same numerals as in the previous embodiment and the descriptions of the same structures as in the previous embodiment are omitted in the following descriptions.

Referring to FIGS. 5 and 6, a drum-like support member 50 is engaged with a hole 51 of the cowl panel 6 at the upper end 50a thereof, and a shaft member 52 is inserted a through hole 53 of the support member 50 and secured to the cowl panel 6 by engaging the screw portion 54 thereof with a nut 55 and washer 56. There is provided a drum-like member 57 so as to be rotatably supported by a convex portion 50b of the support member 50 and a receiver 58 formed at the lower end of the shaft member 52.

There are provided a first lever 59 extending laterally from the vicinity of the upper end of the drum-like member 57 and a second lever 60 extending laterally from the vicinity of the lower end of the drum-like member 57 in the opposite direction to that in which the first lever 59 extends. The first lever 59 is formed at the end thereof with a pin 61 engaged with one end 42a of the operation link 42. The bracket 29 for supporting the wiper driving device 26 is fixed to the dash lower panel 1 at a position lower than the wiper shaft 15. The end 40a of the operation lever 40 is secured to the upper end 35a of the rotatable shaft 35 by the bolt 41 and the other end 40b of the operation lever 40 and the second lever 60 of the drum-like member 57 are connected by a transmission link 62 such that one end 62a of the transmission link 62 is engaged with a pin 43 formed at the end 40b of the operation lever 40 and that the other end 62b of the transmission link 62 is engaged with a pin 63 formed at the end of the second lever 60.

The thus-constituted wiper mounting structure operates as follows.

When the wiper motor 27 is driven, the rotatable shaft 35 is rotated and the operation lever 40 fixed at the upper end 35a of the rotatable shaft 35 is swung about the rotatable shaft 35 so that the transmission link 62 is reciprocated and that the second lever 60 of the drum-like member 57 is swung about the shaft member 52. Since, in accordance with the swinging movement of the second lever 60, the first lever 59 is swung about the shaft member 52, the operation link 42 is reciprocated so that the lever 21 of the wiper shaft 15 is swung about the wiper shaft. Further, the movement of the lever 21 is transmitted to the lever 22 of the wiper shaft 16 by the link 23 and the lever 22 is also swung about the wiper shaft 16 engaged with the mounting member 14 fixed to the cowl panel 6. As a result, since the wiper shafts 15 and 16 are rotated in accordance with the swinging of the levers 21 and 22, the respective wiper arms 17 and 18 are swung about the wiper shafts 15 and 16, and the two wiper blades 19 and 20 synchronously sweep the surface of the front window glass 7. The inside structure of the gear case 28 is the same as in the previous embodiment.

According to the above described embodiment, since the wiper driving device 26 is secured to the dash lower panel 1 so that it is positioned lower than the upper end 1a of the dash lower panel 1, it is possible to remarkably lower the levels of the cowl panel 6 and the bonnet 10 in a similar manner to the previous embodiment. Further, since the worm gearing 30 is employed for the gear mechanism, the gear mechanism can be made compact. Moreover, since there are provided the drum-like member 57 and the transmission link 62 and the swinging movement of the operation lever 40 is transmitted through the transmission link 62 and the drum-like member 57 to the operation link 42, it is possible to secure the wiper driving device 26 to the dash lower panel 1 at an arbitrary position.

Figure 7:
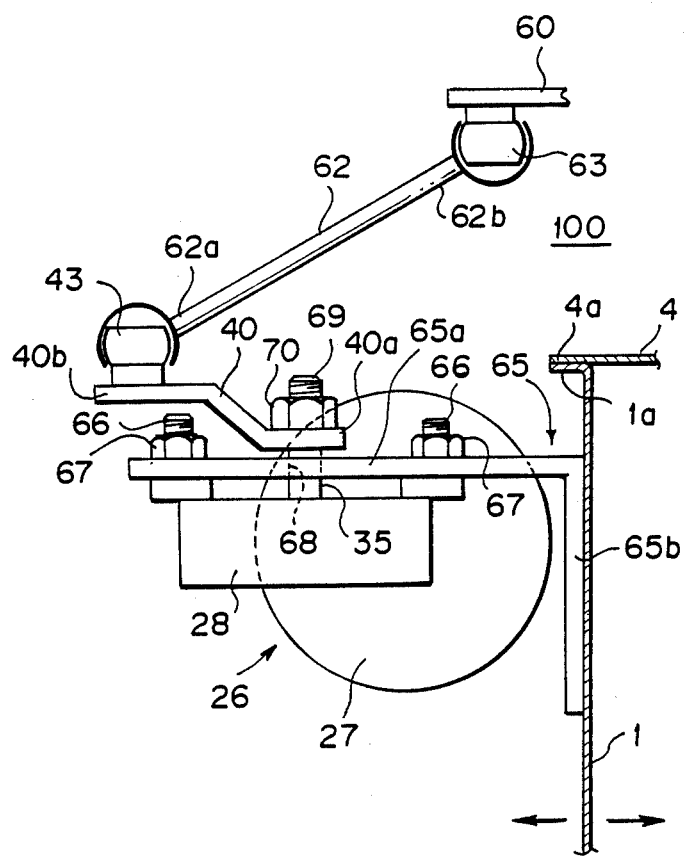
FIG. 7 is a schematic drawing showing a cross-sectional view of a wiper mounting structure which is a modification of the structure shown in FIGS. 5 and 6.

FIG. 7 shows a modification of the wiper mounting structure shown in FIGS. 5 and 6.

Referring to FIG. 7, the wiper driving device 26 is secured through a bracket 65 to the dash lower panel 1 and the bracket 65 consists of a securing portion 65a for securing the gear case 28 and a wall portion 65b extending downwardly from the end of the securing portion 65a which is secured to the dash lower panel 1 by bolts and nuts. The gear case 28 is secured to the securing portion 65a of the bracket by inserting bolts 66 extending from the upper surface of the gear case 28 into holes (not shown) of the securing portion 65a and engaging the bolts 66 with nuts 67. The rotatable shaft 35 of the gear case 28 extends through a hole 68 and one end 40a of the operation lever 40 is fixed to a screw portion 69 of the roatable shaft 35 by a nut 70. One end 62a of the transmission link 62 is engaged with the pin 43 formed at the end 40b of the operation lever 40 and the other end 62b of the transmission link 62 is engaged with the pin 63 formed at the end of the second lever 60.

According to the modification shown in FIG. 7, since the wiper driving device 26 can be secured to the upper portion of the dash lower panel 1 by employing the bracket 65, it is possible to shorten the length of the rotatable shaft 35 of the gear case 28.

Figure 8:
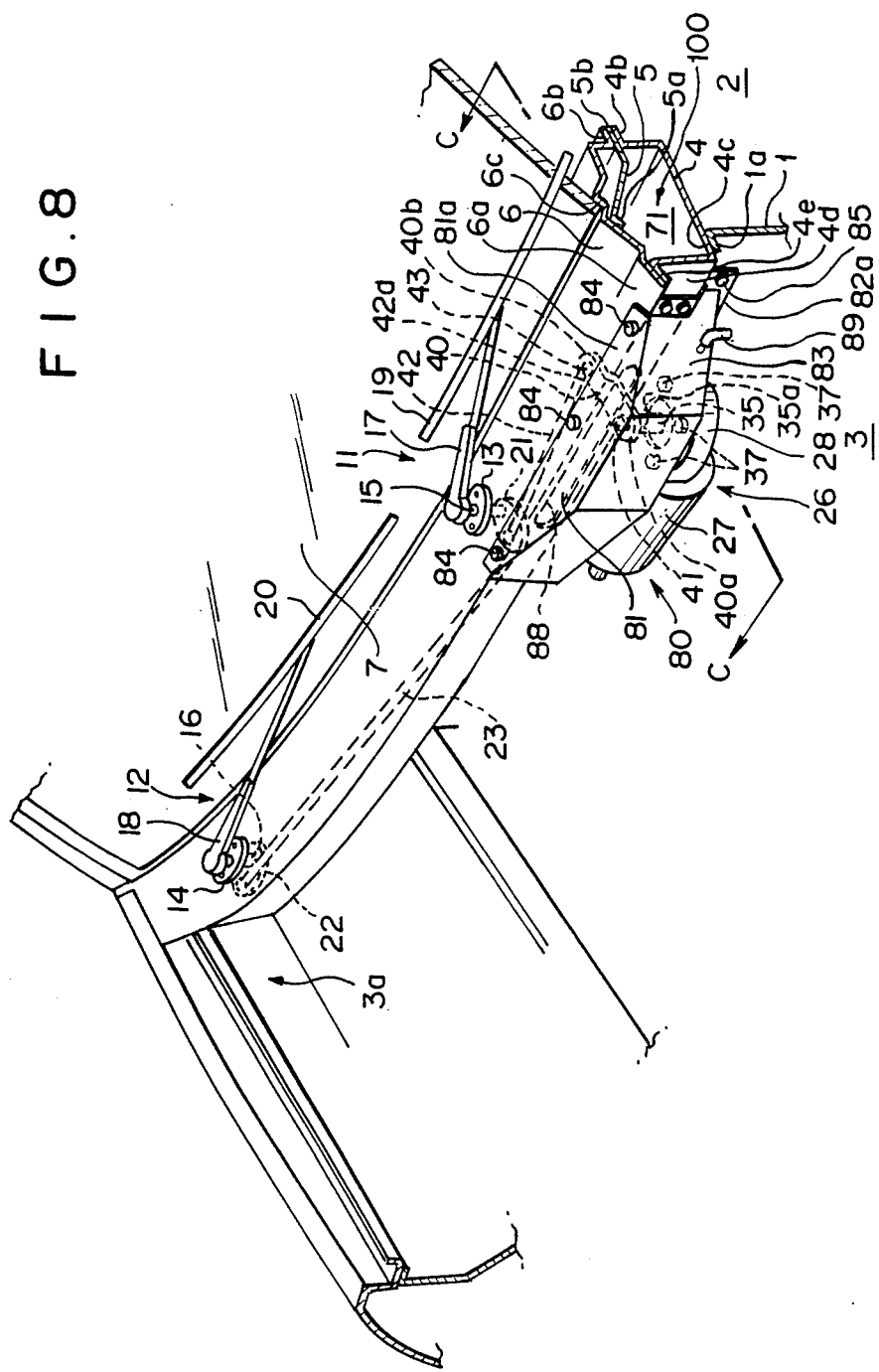
FIG. 8 is a schematic drawing showing a perspective view of a wiper mounting structure which is a further embodiment of the present invention.
Figure 9:
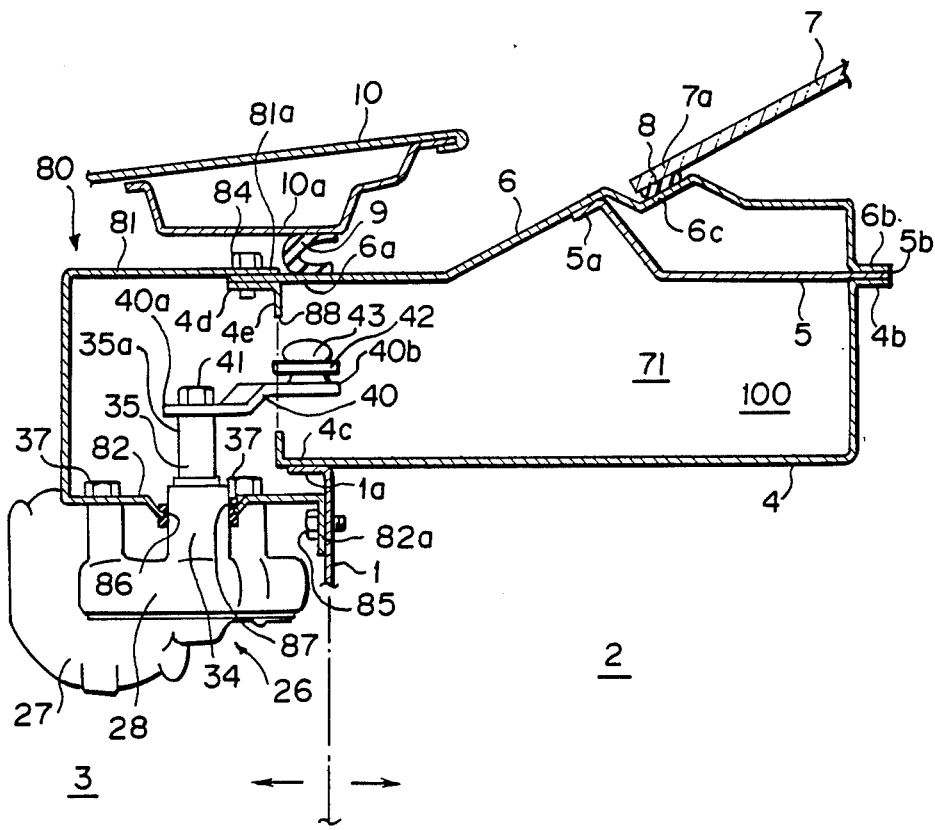
FIG. 9 is a schematic drawing showing a cross-sectional view taken on line C—C of FIG. 8.

FIGS. 8 and 9 show a wiper mounting structure which is a further embodiment of the present invention.

In FIGS. 8 and 9, corresponding parts are designated by the same numerals as in the previous embodiments and the descriptions of the same structures as in the previous embodiments are omitted in the following descriptions.

Referring to FIGS. 8 and 9, the upper end 1a of the dash lower panel 1 is connected with the lower front end portion 4c of a dash upper panel 4. The rear end 4b of the dash upper panel 4 is connected with both the rear end 5b of a reinforcing plate 5 and the rear end 6b of a cowl panel 6 and the front end 5a of the reinforcing plate 5 is connected with the inner surface of the cowl panel 6. The upper front end portion 4d of the dash upper panel 4 is connected with the front end 6a of the cowl panel 6 and a cowl box 100 is formed by the dash upper panel 4, the cowl panel 6 and the reinforcing plate 5. Thus, the cowl box 100 has a closed space 71 therein and is disposed at the upper end 1a of dash lower panel 1 and extends laterally with respect to the vehicle body and is connected to the side walls 3a of the engine compartment 3 at the both side ends thereof. The cowl panel 6 is formed with a convex portion 6c to support the lower end 7a of a front window glass 7 through a supporting member 8 and the rear end 6a of the cowl panel 6 is engaged with the sealing member 9 which is contacted with the lower portion 10a of the rear end of a bonnet (hood) 10.

The bracket 80 for supporting the wiper driving device 26 has a box-like shape and is secured to the dash upper panel 4 such that the opening thereof faces the front surface 4e of the dash upper panel 4. More specifically, the rear end 81a of the upper plate 81 of the bracket 80 is fixed to the upper front end portion 4d and the front end 6c of the cowl panel 6 by a bolt 84, and the rear end 82a of the lower plate 82 of the bracket 80 is fixed to the dash lower panel 1 by a bolt 85. The wiper driving device 26 is fixedly secured to the lower plate 82 of the bracket 80 by bolts 37 extending through holes (not shown) of the lower plate 82 and engaged with bolt holes (not shown) of the upper portion of the gear case 28. The base portion 34 for supporting the rotatable shaft 35 of the gear case 28 is received by a hole 86 of the lower plate 82 of the bracket 80 and the base portion 34 and the lower plate 82 are sealed by a sealing member 87 inserted into the hole 86.

The one end 40a of the operation lever 40 is fixed to the upper end 35a of the rotatable shaft 35 and the pin 43 formed at the other end 40b of the operation lever 40 is engaged with the one end 42a of the operation link 42 and the design is such that the operation link 42 is reciprocated in accordance with the swinging movement of the operation lever 40. The front plate 4e of the dash upper panel 4 is formed with an elongated hole 88 to ensure such operation of the operation lever 40 and the operation link 42. Further, there is a drain 89 at the lower end of the side plate 83 of the bracket 80.

The operation of the above described wiper mounting structure is the same as that of the embodiment shown in FIGS. 1 and 2. More specifically, since the operation lever 40 is swung about the rotatable shaft 35 in accordance with the rotation of the rotatable shaft 35 and the operation link 42 is reciprocated, the wiper 11 is operated and the wiper 12 is also operated by the reciprocating movement of the link 23.

According to this embodiment, since the wiper driving device 26 is secured through the bracket 80 to the vehicle body so that it is positioned lower than the upper end 1a of the dash lower panel 1, it is possible to remarkably lower the levels of the cowl panel 6 and the bonnet 10 in a similar manner to the previous embodiments irrespective of the height of the bracket 80 (See FIG. 8). Further, the closed space formed by the dash upper panel 4, the cowl panel 6 and the reinforcing plate 5 can be utilized as an air passage for an air conditioner (not shown) and this space is communicated through the elongated hole 88 with a closed space formed by the bracket 80. Thus, the inner volume of the closed space as an air passage can be increased at this portion, whereby the air suction capability can be improved.

Figure 10:
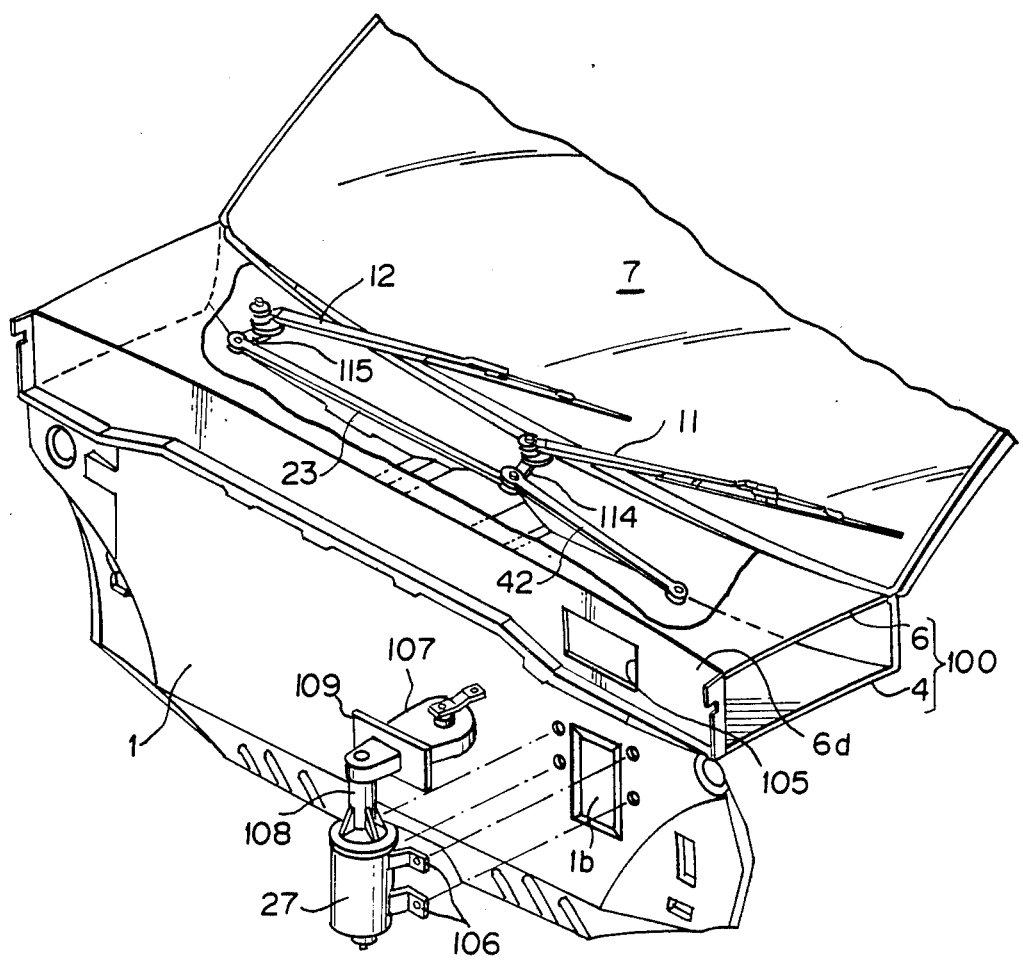
FIG. 10 is a schematic drawing showing a perspective view of a wiper mounting structure which is a further embodiment of the present invention.
Figure 11:
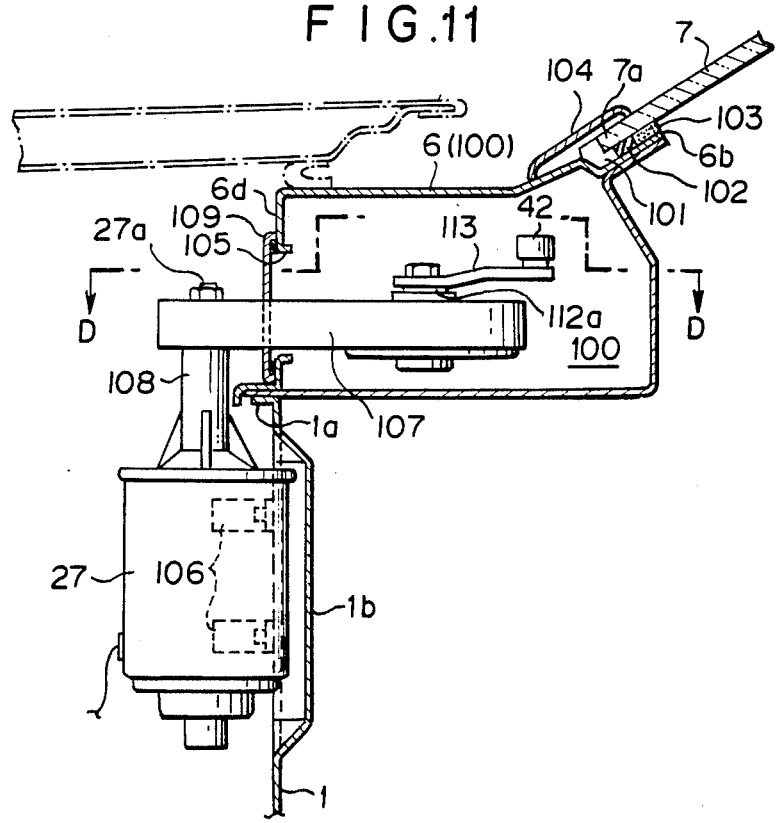
FIG. 11 is a schematic drawing showing a longitudinal cross sectional view of FIG. 10.
Figure 12:
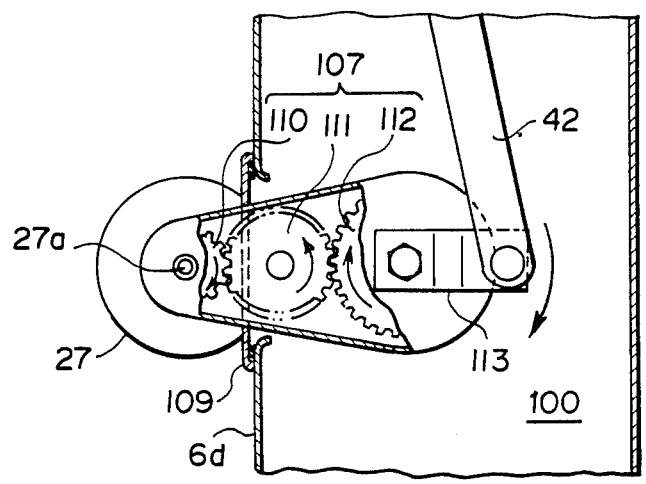
FIG. 12 is a schematic drawing showing a cross-sectional view taken on line D—D of FIG. 11

FIGS. 10, 11 and 12 shows a wiper mounting structure which is a further embodiment of the present invention. In FIGS. 10, 11 and 12, corresponding parts are designated by the same numerals as in the previous embodiments and the descriptions of the same structures as in the previous embodiments are omitted in the following.

Referring to FIGS. 10, 11 and 12, there are provided a cowl box 100 formed by the cowl panel 6 and the dash upper panel 4 at the lower end 7a of the front window glass 7 and the dash lower panel 1 extending downwardly from the front end 4a of the dash upper panel 4. Thus, the cowl box 100 has a box-like shape and extends in the lateral direction of the vehicle body at the upper end 1a of the dash lower panel 1 and is connected to the side walls 3a of the engine compartment 3 at the side ends thereof.

The lower end 7a of the front window glass 7 is fixed to the rear end 6b of the cowl panel 6 at several positions with positioning blocks 101, adhesive agent 102 and dam members 103 and a molding 104 covers a portion from the lower end 7a to the cowl panel 6.

A portion in the vicinity of the left end of the front wall 6d of the cowl panel 6 is formed with a rectangular hole 105 and a portion in the vicinity of the upper end 1a of the dash lower panel 1 is formed with the convex portion 1b below the rectangular hole 105.

The wiper motor 27 for driving the wipers 11 and 12 is secured to the dash lower panel 1 with four bolts (not shown) and four securing members 106 such that the motor 27 is engaged with the convex portion 1b and that the output shaft 27a thereof is disposed in the vertical direction parallel to the dash lower panel 1.

There are provided a gear train 107 engaged with a bearing member 108 of the wiper motor 27 at the upper end of the bearing member 108 and the gear train extends from the upper end of the bearing member 108 through the rectangular hole 105 to substantially the center portion of the cowl box 100 and is disposed in the horizontal plane perpendicular to the shaft 27a of the wiper motor 27 such that most of the gear train 107 is disposed in the cowl box 100. The reference numeral 109 designates a cover plate secured to a case for the gear train 107 for covering the clearance between the gear train case and the rectangular hole 105.

As shown in FIGS. 11 and 12, the gear train 107 consists of a driving gear 110 fixed to the shaft 27a of the wiper motor 27, an idler gear 111 engaged with the driving gear 110, a driven gear 112 engaged with the idler gear 111 and a cover, and the shaft 112a is disposed in the vertical direction.

The end of a crank arm 113 for reciprocating the operation link 42 is fixed to the shaft 112a of the driven gear 112. Therefore, when the shaft 27a of the wiper motor 27 is driven, the crank arm 113 is driven through the driving gear 110, the idler gear 111, the driven gear 112 and the gear shaft 112a.

The wipers 11 and 12 are swingably mounted on the cowl panel 6 at the ends thereof and the upper ends of driving arms 114 and 115 are fixed to the ends of the respective wipers 11 and 12. There is provided at the rear end 6b of the cowl panel 6 a window for receiving the wipers 11 and 12 in the cowl box 100 when they are not used.

The link 23 is swingably connected with the lower end of the driving arm 115 by a pin at one end thereof and is also swingably connected with the lower end of the driving arm 114 by a pin at the other end thereof. The operation link 42 is swingably connected with the lower end of the driving arm 114 by a pin at one end thereof and is swingably connected with the end of the crank arm 113 at the other end thereof. The crank arm 113, the link 23, the operation link 42 and the driving arms 114, 115 are arranged in the cowl box 100.

The operation of the above described wiper mounting structure is as follows.

When the wiper motor 27 is driven, the driven gear 112 is driven through the driving gear 110 and the idler gear 111 in accordance with the motor shaft 27a. As a result, the crank arm 113 is swung to reciprocate the operation link 42 and the link 23 and the wipers 11 and 12 are synchronously swung about the ends thereof.

According to the above described embodiment, since the wiper motor 27 is disposed in the vertical direction such that the output shaft 27a is directed upwardly, the wiper motor 27 can be arranged at a position lower than the gear train 107 and since the gear train 107 is formed flat with respect to the vertical direction by the three gears 110, 111 and 112 having vertical shafts, the cowl box 100 can be flat with respect to the vertical direction. Further, since the shaft 112a of the driven gear 112 is disposed vertically, the movement of the operation link 40 and the link 23 is restricted within a flat range with respect to the vertical direction. Therefore, according to this embodiment, it is possible to remarkably lower the levels of the cowl panel 6 and bonnet 10 in the similar manner to the previous embodiments.

As described above on the basis of the preferred embodiments of the present invention, according to the present invention, since the levels of a cowl panel and a bonnet can be lowered remarkably with a simple structure, it is possible to reduce the air resistance of the vehicle body and obtain a vehicle having a good appearance.

The present invention has thus been shown and described with reference to specific embodiments. However, it should be noted that the present invention is in no way limited to the details of the described arrangements but changes and modifications may be made without departing from the scope of the appended claims.

For example, the bracket 80 employed in the embodiment shown in FIGS. 4 and 5 can be used for the wiper mounting structure shown in FIGS. 1 and 2 in place of the bracket 29.

Further, although the cowl box 100 is formed by the dash upper panel 4, the reinforcing plate 5 and the cowl panel 6, or the dash upper panel 4 and the cowl panel 6 in the above described embodiments, the cowl box 100 may be formed by additional members in place of the above described panel or plate members such that the cowl box 100 consists of a bottom portion connected to the upper edge portion of the dash lower panel 1 and extending backwardly from the upper end of the dash lower panel 1, a rear portion extending upwardly from the rear edge portion of the bottom portion and an upper portion extending forwardly from the upper edge portion of the rear portion or that the cowl box 100 consists of a bottom portion connected to the upper edge portion of the dash lower panel 1 and extending backwardly from the upper end of the dash lower panel 1, a rear portion extending upwardly from the rear edge portion of the bottom portion and an upper portion extending forwardly from the upper edge portion of the rear portion and a front portion extending downwardly from the front edge portion of the upper portion, the lower edge portion of the front portion being connected with the front edge portion of the bottom portion.

We claim:

1. A wiper mounting structure for a vehicle having a cabin, an engine compartment, dash lower panel means separating the cabin from the engine compartment, dash upper panel means above the dash lower panel means, a connection between said dash upper panel means and an upper portion of said dash lower panel means, a bonnet means, cowl panel means and a further connection between said cowl panel means and said dash upper panel means, the cowl panel means having one end supporting a lower end of a front window glass, the cowl panel means having an opposite end disposed adjacent a rear end of the bonnet means, said wiper mounting structure comprising wiper means, first securing means securing said wiper means to said cowl panel means, wiper driving means and second securing means securing said wiper driving means to said dash lower panel means, said wiper driving means comprising a wiper motor having a wiper motor output shaft and gear means having a gear means output shaft, means connecting the gear means with said wiper output shaft, link means connecting said wiper means and said gear means output shaft, and the gear means output shaft extending upwardly in a substantially vertical direction, wherein the motor output shaft is disposed in a direction substantially parallel to said dash lower panel means and laterally with respect to the vehicle body, wherein said gear means and said link means are disposed substantially horizontally and the structure includes operation lever means connecting the gear means and the link means, one end of said operation lever means being fixed to said output shaft of the gear means, the other end of said operation lever means being engaged with the end of said link means, and which structure further includes a rotatable member rotatably supported by the vehicle body about a vertical axis at the side of the engine compartment and a pair of levers fixed to said rotatable member so as to be offset with respect to the vertical direction and extending substantially horizontally in opposite directions to each other, one of said levers being engaged through a link member with said operation lever means and the other of said levers being engaged with the end of said link means.

2. A wiper mounting structure in accordance with claim 1 which further includes bracket means having an L-shaped cross section and having a vertical portion extending vertically and a horizontal portion extending horizontally, third securing means securing said vertical portion to said dash lower panel means and fourth securing means securing said wiper motor and said gear means to the lower surface of said horizontal portion.

3. A wiper mounting structure in accordance with claim 2 in which said bracket means is arranged such that said horizontal portion is positioned higher than said vertical portion.

4. A wiper mounting structure in accordance with claim 3 in which the front end of said horizontal portion is bent upwardly and connected with said cowl panel means so as to form a closed space.

5. A wiper mounting structure in accordance with claim 2 which further includes a reinforcing member connecting said horizontal portion and said vertical portion to reinforce said bracket means.

6. A wiper mounting structure for a vehicle dash lower panel means, said vehicle dash lower panel means including a plate-like member separating a cabin of said vehicle from an engine compartment of said vehicle, said plate-like member being arranged laterally with respect to said vehicle, cowl box means including a box-like member disposed laterally with respect to said vehicle at an upper end of said dash lower panel means and having its ends thereof connected with a sidewall of said engine compartment, and front window panel means supported by an upper edge of said cowl box means, said wiper mounting structure comprising wiper means for wiping said front window panel means, first securing means securing said wiper means to said cowl box means, wiper driving means for driving said wiper means, said wiper driving means comprising a wiper motor having a motor output shaft and gear means having a gear means output shaft, means connecting said gear means with the motor output shaft, said motor output shaft being disposed in a direction substantially parallel to said dash lower panel means, link means connecting said wiper means and the gear means output shaft, the gear means output shaft extending upwardly in substantially a vertical direction, said gear means and said link means being arranged substantially horizontally and connected together by operation lever means, said operation lever means having one end secured to the gear means output shaft and an opposite end engaged with one end of said link means, wherein said cowl box means comprises a bottom portion, and means connecting the bottom portion to the upper edge of said dash lower panel means, the bottom portion extending backwardly from the upper end of said dash lower panel means, a rear portion extending upwardly from the rear edge of said bottom portion and an upper portion extending forwardly from the upper edge of said rear portion, and wherein said first securing means secures said wiper means to said cowl box means at a front side of said dash lower panel means with respect to the vehicle body.

7. A wiper mounting structure in accordance with claim 6 which further includes bracket means having an L-shaped cross section and having a vertical portion extending vertically and a horizontal portion extending horizontally, second securing means securing said vertical portion to said dash lower panel and third securing means securing said wiper motor and said gear means to the lower surface of said horizontal portion.

8. A wiper mounting structure in accordance with claim 7 in which the front end of the horizontal portion is bent upwardly and connected with said cowl box means so as to form a closed space.

9. A wiper mounting structure in accordance with claim 7 which further includes a reinforcing member connecting said horizontal portion and said vertical portion to reinforce said bracket means.

10. A wiper mounting structure in accordance with claim 6 which further includes a rotatable member rotatably supported by the vehicle body about a vertical axis at the side of the engine compartment and a pair of levers fixed to said rotatable member so as to be offset with respect to the vertical direction and extending substantially horizontally in opposite directions to each other, one of said levers being engaged through a link member with said operation lever means and the other of said levers being engaged with the end of said link means.

* * * * *